United States Patent [19]
Aprahamian et al.

[11] Patent Number: 5,886,800
[45] Date of Patent: Mar. 23, 1999

[54] LARGE OPTICS COMPENSATED IMAGING SYSTEMS

[75] Inventors: Robert Aprahamian, Hermosa Beach; George L. Clark, Manhattan Beach; Lee O. Heflinger, Torrance, all of Calif.; Jesper Munch, BelAir, Australia; Ralph Frederick Wuerker, Westlake Village, Calif.

[73] Assignee: TRW Inc., Redondo Beach, Calif.

[21] Appl. No.: 47,863

[22] Filed: Apr. 15, 1993

Related U.S. Application Data

[62] Division of Ser. No. 603,045, Oct. 25, 1990, abandoned.

[51] Int. Cl.$^6$ .............................. G02B 5/32; G02B 26/08
[52] U.S. Cl. .............................. 359/16; 359/300; 359/364
[58] Field of Search .............................. 359/3, 7, 15, 16, 359/300, 337, 338, 364

[56] References Cited

U.S. PATENT DOCUMENTS 4,927,251  5/1990  Schoen .

*Primary Examiner*—Mark Hellner
*Attorney, Agent, or Firm*—Michael S. Yatsko

[57] ABSTRACT

A technique for correcting wavefront aberrations introduced by large primary optical elements in portions of the electromagnetic spectrum. The aberrations of the primary element are first transferred to a beacon beam and this aberrated beam is interfered with a reference beam in a holographic medium. These beams are then turned off and a beam from a distant object, containing the same aberrations, is allowed to diffract from the hologram. The diffracted beam from the hologram contains the image of the distant object with aberrations removed. Use of this technique permits the construction of large optical elements inexpensively, since surface tolerances of the elements can be substantially relaxed.

7 Claims, 4 Drawing Sheets

LARGE OPTICS COMPENSATED IMAGING SYSTEMS

CROSS-REFERENCE TO RELATED APPLICATION

This is a division of Ser. No. 07/603,045, filed Oct. 25, 1990, by Robert Aprahamian et al., having the same title, and subsequently abandoned.

BACKGROUND OF THE INVENTION

This invention relates generally to high resolution imaging telescopes and, more particularly, to techniques for reducing the size and cost of such telescopes. An imaging telescope has a primary optical element, usually a mirror in large telescopes, and an optical train of other elements, all of which cooperate to produce an image of a distant object at a focal plane. Present day high resolution imaging telescopes are constrained in size because of the costs of fabricating high precision mirror surfaces. It has been observed that the cost of fabricating large optical mirrors goes up in proportion to the third power of the mirror diameter. Telescopes of over two to three meters in diameter are prohibitively expensive. Furthermore, the weight of a telescope primary mirror is also a limiting factor if the telescope is to be used in space, since the cost of placing any load into orbit around the earth is dependent on its weight and volume.

Apart from mechanical innovations in the form of lightweight honeycomb structures, prior activity directed to reducing the cost of large telescopes has been centered on the field of adaptive optics. An adaptive primary mirror can be constructed using piezoelectric actuators to change the shape of the mirror surface to compensate for aberrations introduced either in optical elements or in a medium through which light is received at the telescope. This approach is used to correct atmospheric aberrations and requires a wavefront sensor to sample the phase front of an incoming reference wave, and a relatively complex control system to apply distortions to the primary mirror, to remove the effect of the aberrations. Theoretically, the same technique could be used to dynamically measure distortions introduced by a mirror, and to correct any such distortions, but there are a number of problems with this approach.

First, the adaptive mirror, which is sometimes referred to as a "rubber mirror," is itself an expensive item, and the requirement for multiple actuators, a control system, and a wavefront sensor all contribute significantly to the weight and cost of the telescope. Also, conventional adaptive optics telescopes use reference waves that are as distant as objects to be imaged, so that the reference phase is flat. This places signal-to-noise constraints on the wavefront sensor, which receives only a limited number of photons from an object to be imaged.

It is also been suggested to use a phase conjugation process to correct for aberrations introduced in optical components or in the transmission medium. In this approach, an incident probe beam is reflected from or passed through an optical element, and becomes distorted by the inherent deformities of the optical element. If the incident beam is then phase conjugated and reflected from or passed through the distorting element again, the aberrations introduced in the first pass are effectively canceled or removed during the second pass. This approach is better suited for telescopes that produce a high-power beam than it is for imaging a relatively weak image beam from a distant object.

Ideally, what is needed is a technique for correcting structural aberrations, introduced in the primary of the telescope, farther "downstream" in the train of optical elements, closer to the focal plane at which the image is produced. Then the structural requirements could be relaxed and cheaper, lightweight materials could be used in the construction of the telescope primary.

It will be appreciated from the foregoing that there is still a significant need for improvement in the field of large imaging telescopes, especially those intended for use in space. The present invention fulfills this need.

SUMMARY OF THE INVENTION

The present invention resides in a technique in which a locally generated beacon beam is used to sample aberrations in the primary optical element of an imaging telescope, and the effects of these aberrations are removed from an image beam prior to focusing the image beam at the focal plane. Principally, the invention resides in an aberration correction imaging system for use in an imaging telescope having a large primary optical element and a secondary optical element.

Briefly, and in general terms, the system comprises first optical means, for locally generating a beacon beam that impinges on the large primary optical element and is affected by any aberrations of the element; holographic aberration correction means; and second optical means, for directing the aberrated beacon beam and an aberrated image beam into the holographic aberration correction means at different phases of operation. The holographic aberration correction means produces, during a reading phase, an output beam proportional to the image beam, but having the aberrations removed.

In one phase of operation, the holographic aberration correction means encodes the aberrations in the beacon beam into a hologram. In a second phase of its operation, the holographic aberration correction means produces a practically aberration-free image beam as a result of interaction between the hologram and an aberrated image beam directed at the hologram.

More specifically, the first optical means includes a laser reference light source, and a beacon reflector, positioned to receive light from the laser reference light source and to expand the light source to fill the primary optical element. The beacon reflector is aligned in such a manner that the beacon light beam impinges on the primary optical element at a slightly different angle from that of the image beam.

Ideally, the distance between the beacon reflector and the primary optical element in the phase conjugation embodiment of the invention is at least approximately five times the focal length of the primary optical element, and may be approximately five to ten times the focal length of the primary optical element.

In accordance with one important aspect of the invention, the means for generating the beacon beam provides a beam of at least one selected wavelength different from the wavelength of the image beam. The phase errors caused by differences in the angles of incidence of the beacon beam and the image beam on the primary optical element are thereby minimized over at least one region of the primary optical element. In another preferred form of this embodiment, the means for generating the beacon beam provides multiple beams of different selected wavelengths, directed at contiguous regions of the primary optical element. The aberration-free reference beam source also includes means for generating multiple beams of the same selected wavelengths as the beacon beams, for interference with corresponding beacon beams in contiguous regions of the hologram. Preferably, the multiple beacon beams, multiple reference beams, and multiple regions of the hologram are annular in shape. Phase errors are thus minimized over multiple annular regions of the primary optical element. It is also preferable to adjust the angles of incidence of the beacon beams relative to those of the reference beams, to ensure uniform fringe spacing in all annular regions of the hologram, and to adjust the phase of the beacon beams to ensure alignment and phase coherence of the fringes in the hologram.

In terms of a method, the present invention includes the steps of locally generating a beacon beam that impinges on the large primary optical element; modifying the beacon beam with any phase-affecting aberrations of the primary optical element, to produce an aberrated beacon beam; producing from the primary optical element an aberrated image beam; and interacting the aberrated beacon beam and the aberrated image beam, to produce an aberration-free image beam. The step of interacting the aberrated beacon beam and the aberrated image beam includes introducing the aberrated beacon beam and the aberrated image beam into a holographic device, which is operative to produce the aberration-free image beam. Further, the step of introducing the beams into the holographic device includes first encoding the aberrations into a hologram by interfering the aberrated beacon beam with a locally generated aberration-free reference beam; and then directing the aberrated image beam onto the encoded hologram, to produce the aberration-free image beam.

It will be appreciated from the foregoing summary that the present invention represents a significant advance over other techniques for removing aberrations introduced by large elements of an optical train. In particular, the use of adaptive optical elements is avoided, and removal of aberrations is accomplished without the need for two passes across the aberrating elements. Other aspects of the invention will become apparent from the following more detailed description, taken in conjunction with the accompanying drawings.

DESCRIPTION OF THE PREFERRED EMBODIMENTS

Figure 1:
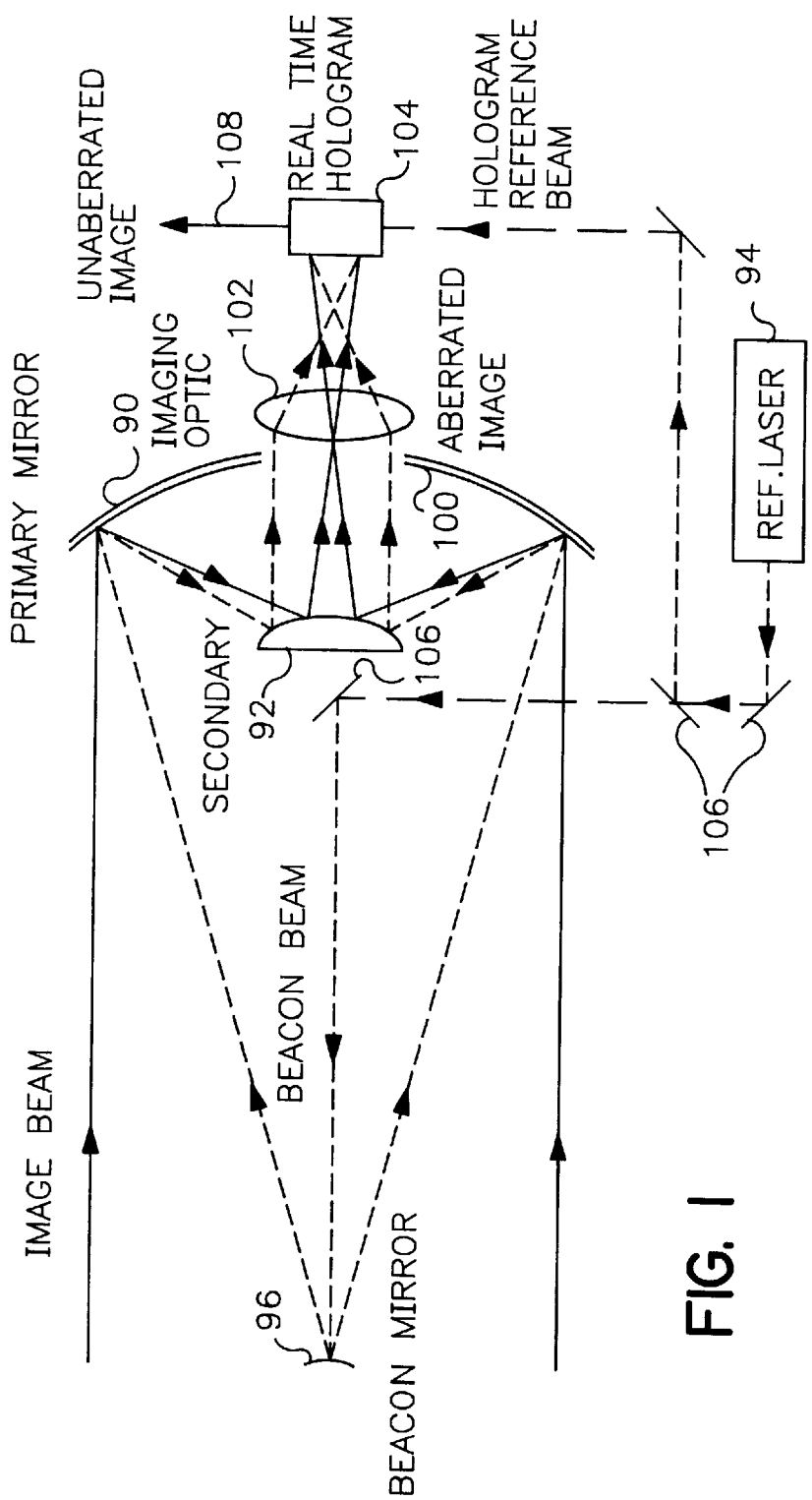
FIG. 1 is a schematic view of a large telescope system in accordance with the invention, using a hologram for aberration correction.

As shown in the drawings for purposes of illustration, the present invention is concerned with a technique for removing the effects of aberrations introduced by surface imperfections in a primary optical element of a large imaging telescope. Prior to the invention, compensation for aberrations of this type could only be achieved by use of cumbersome adaptive optics, or using a phase conjugation approach requiring two passes through the aberrating optical element.

In accordance with the invention, a locally generated beacon beam is used to measure the aberrations introduced by the primary optical element, and the aberrated beacon beam is then introduced into a holographic device, from which an aberration-free image beam is later obtained, as further explained below. Aberration correction is achieved by means of a hologram, in which the aberrations are encoded upon exposure to the aberrated beacon beam, and from which an aberration-free image beam is generated.

The basic principles of aberration correction using holography are shown in the block diagram of FIG. 1. FIG. 1 shows a primary optical element in the form of a large concave mirror 90, a coaxial secondary mirror 92, a reference laser 94 to provide a beacon beam, and a beacon beam mirror 96. An image beam 98 from a distant object (not shown) impinges on the primary mirror 90, is reflected to the secondary mirror 92, which has a convex surface, and is reflected again through a central aperture 100 in the primary mirror 90. An imaging optical element 102 focuses the image into a hologram 104. The hologram described here by way of example is a real-time hologram using thermoplastic or liquid material, but a variation of the invention could use a permanent of fixed hologram, or silver halide or dichromate gelatin material.

In the holographic embodiment, the beam used to detect the aberrations of the primary optical element is again referred to as the "beacon" beam. The term "reference beam" is used to refer to an aberration-free laser beam directed onto the hologram 104, to interfere with the aberrated beacon beam and to holographically encode the aberrations. As will be seen, the beacon beam and the reference beam may be derived from the same reference laser source 94.

Laser light from the laser source 94 is directed by appropriate mirrors 106, and a portion of the beam is directed to the beacon mirror 96, which expands the beam to practically fill the primary mirror 90. The beacon beam is aberrated in phase by any imperfections in the primary mirror 90. Then the aberrated beacon beam impinges on the secondary mirror 92, is reflected through the aperture 100 and the imaging optical element 102 to the hologram 104. The holographic reference beam, derived from the same laser source 94, is also directed onto the hologram 104. Interference of the reference beam and the aberrated beacon beam at the plane of the hologram results in the encoding of the hologram with the aberrations carried in the beacon beam. This takes place in a first temporal phase of operation. In a second temporal phase, the aberrated image beam is directed onto the real time hologram 104 and, as a result, the hologram produces an aberration-free image beam 108. A shutter (not shown) or other suitable apparatus switches back and forth between the two temporal phases of operation.

Figure 2A:
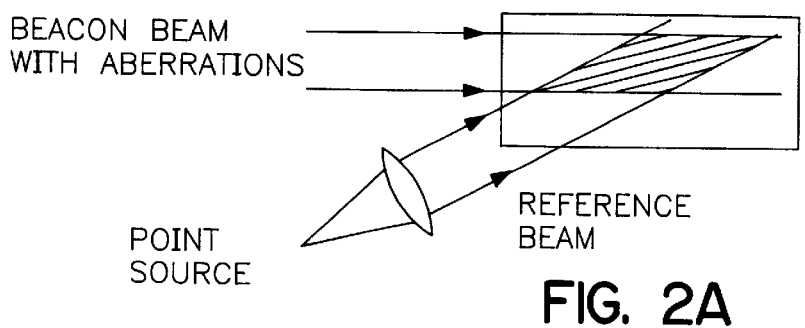
FIGS. 2A–2C are diagrammatic views illustrating holographic principles as applied to aberration correction.
Figure 2B:
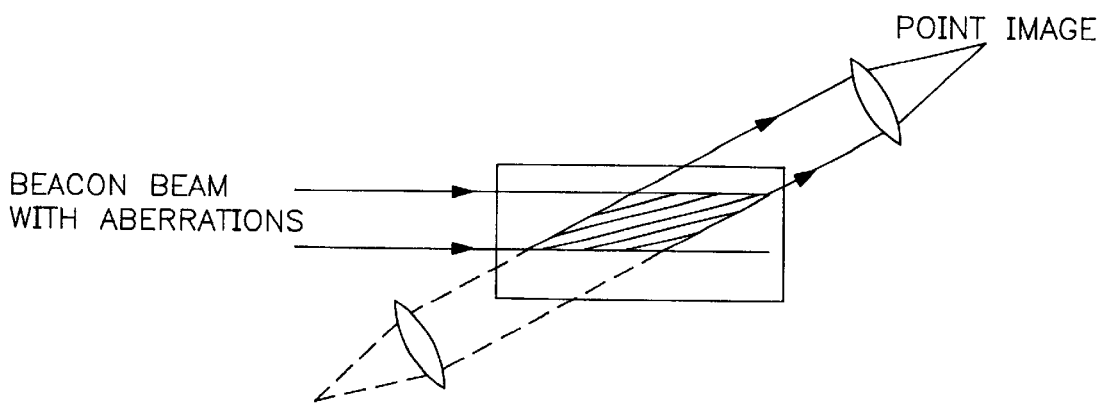
Figure 2C:
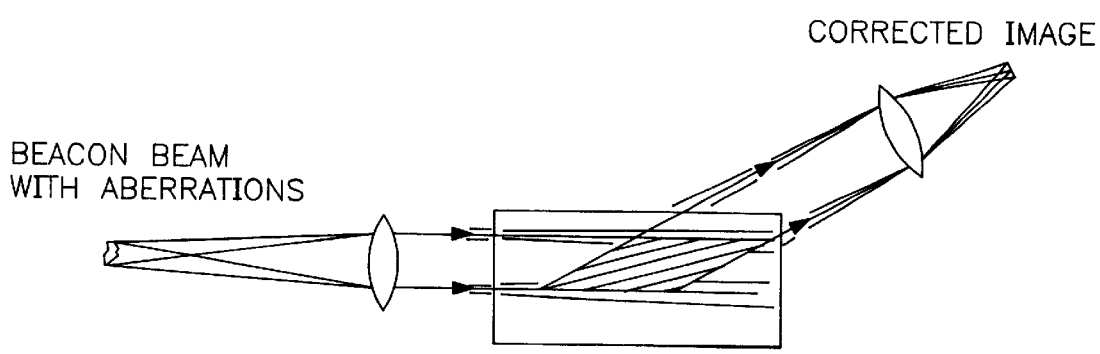

FIGS. 2A–2C illustrate the holographic principle employed in the apparatus of FIG. 1. A hologram is written or encoded as shown in FIG. 2A. The beacon beam with aberrations is interfered with the reference beam to form a hologram of the aberration information. Reading the hologram with the reference beam would result in recreation of the aberrated beacon beam, as shown in FIG. 2B. Reading the hologram with the aberrated target or image beam, as shown in FIG. 2C, results in generation of a corrected or aberration-free image beam.

An important consideration in aberration correction by nonlinear optics is that the technique depends on providing a beacon beam that impinges on the primary mirror with rays having angles closely similar to those of the corresponding rays in the target or image beam. Another way of stating this requirement is that the beacon mirror must be as far from the primary mirror as possible, to produce an incident beacon beam that is as similar as possible to the image beam. For operation in space, this may be practically impossible.

Figure 3:
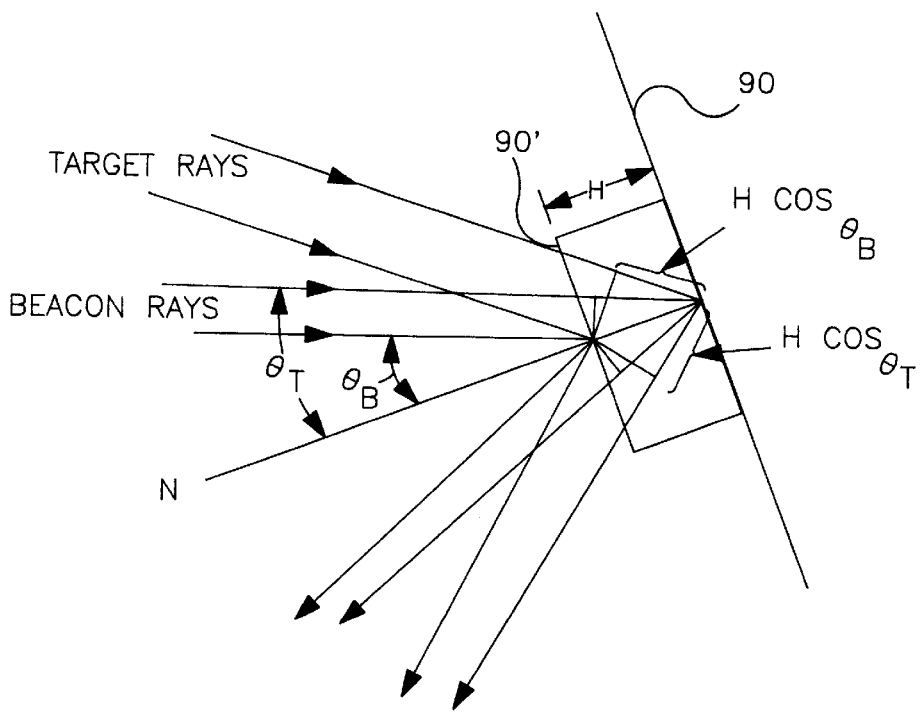
FIG. 3 is a ray-tracing diagram supporting the derivation of an expression for phase angle errors caused by the difference between the angles of incidence of the target beam and the beacon beam.

FIG. 3 shows the angular relationships involved when target (image) rays and beacon rays are incident on the primary mirror at different angles. A piston displacement of the mirror 90 is shown by the alternate mirror element position, at 90', with a displacement distance of H perpendicular to the mirror surface. Target rays are incident on the mirror 90, 90' at an angle $\theta_T$ to the normal N, and beacon rays are incident at an angle $\theta_B$ to the normal. The piston displacement causes the phases of the target and beacon rays to change by different amounts. The hologram records the phase shift sensed by the beacon ray. Then, when the corresponding target ray diffracts from the hologram, that amount of phase shift is subtracted. If the angles are not equal, the phase error sensed by the beacon ray and that suffered by the target ray are not equal and cancellation is not complete. The following equation gives the residual phase error caused by the difference in angle of incidence:

$$\Delta = (4\pi H/\lambda)(\cos\theta_B - \cos\theta_T) \qquad (1)$$

As the distance to the beacon mirror 96 increases, the two angles of incidence become more nearly equal and the phase error approaches zero. However, for good correction the beacon mirror must be at least twenty mirror aperture diameters away from the primary mirror. For a primary mirror of 10 meters in diameter, the beacon mirror must then be about 200 meters distant. Such a system would be cumbersome in the extreme and could not be easily slewed to different fields of view.

Another reason for having a distant reference beam is to minimize vignetting by the optical train of the telescope. Small differences in angle in object space are magnified into large differences within the telescope, and the beacon rays begin to diverge from the target rays and to miss some of the optical elements. This effect is especially troublesome when the magnification of the telescope is large.

A related problem is that placing the beacon source too close to the primary mirror 90 results in spherical aberration. For a relatively close beacon source, the primary mirror should more ideally be a spherical surface. A parabolic surface and a close-in beacon beam source results in undesirable spherical aberration.

Figure 4:
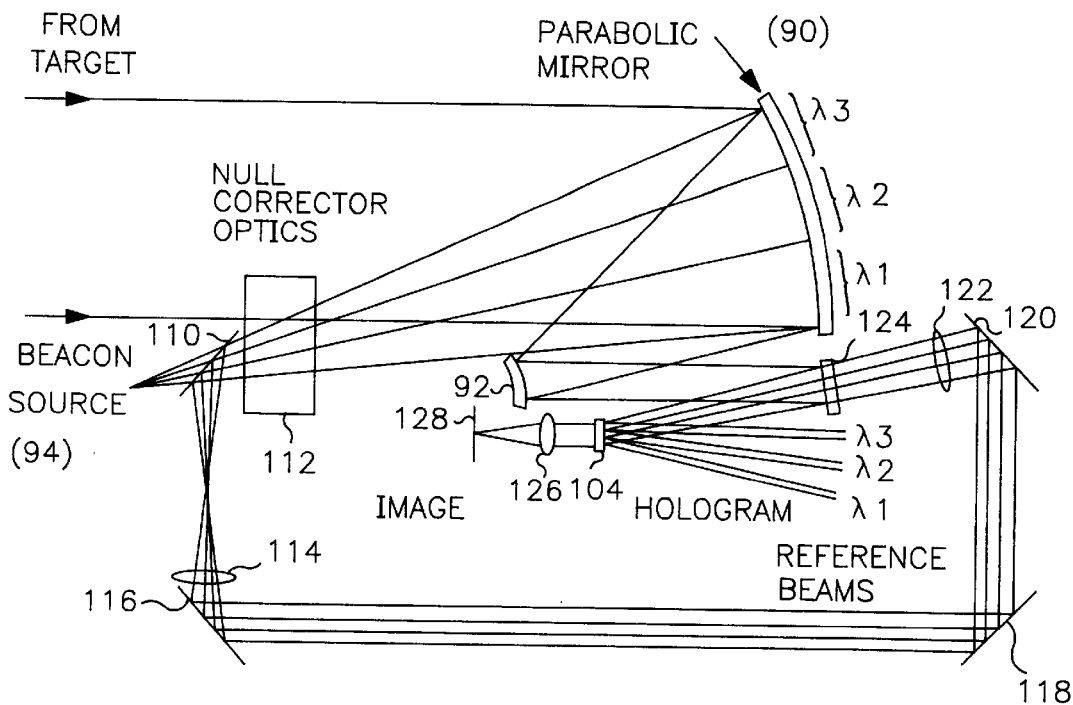
FIG. 4 is a schematic view of a large telescope system in accordance with a preferred embodiment of the invention, in which multiple wavelengths are used for the beacon and reference beams.

In the preferred embodiment shown in FIG. 4, a beacon source 94' is positioned relatively close to the parabolic mirror 90, for example about two mirror diameters away, and is directed through a semireflective mirror 110 and null corrector optics 112, before impinging on the primary mirror 90. The null corrector optics introduce an optical correction that completely compensates for any spherical aberration due to the proximity of the beacon source 94' to the primary mirror 90. Basically, the null corrector optics ensure that all rays from the beacon source 94' impinge on the parabolic mirror at zero degrees to the normal. In other words, all of the rays appear to emanate from the "center of curvature" of the parabolic surface. This feature alone is sufficient to achieve a significant improvement in phase error if the wavelength of the beacon beam is appropriately chosen. Null corrector optics are known in the art, as described, for example, in a text entitled "Optical Shop Testing," Daniel Malacara, editor, John Wiley & Sons (1978).

Equation (1) for the phase angle error can be rewritten as:

$$\Delta = (4\pi H/\lambda_B)(1-[\lambda_B/\lambda_T]\cos\theta_T) \qquad (2)$$

here:

$\lambda_B$=the beacon wavelength, and $\lambda_T$=the target wavelength.

Figure 5:
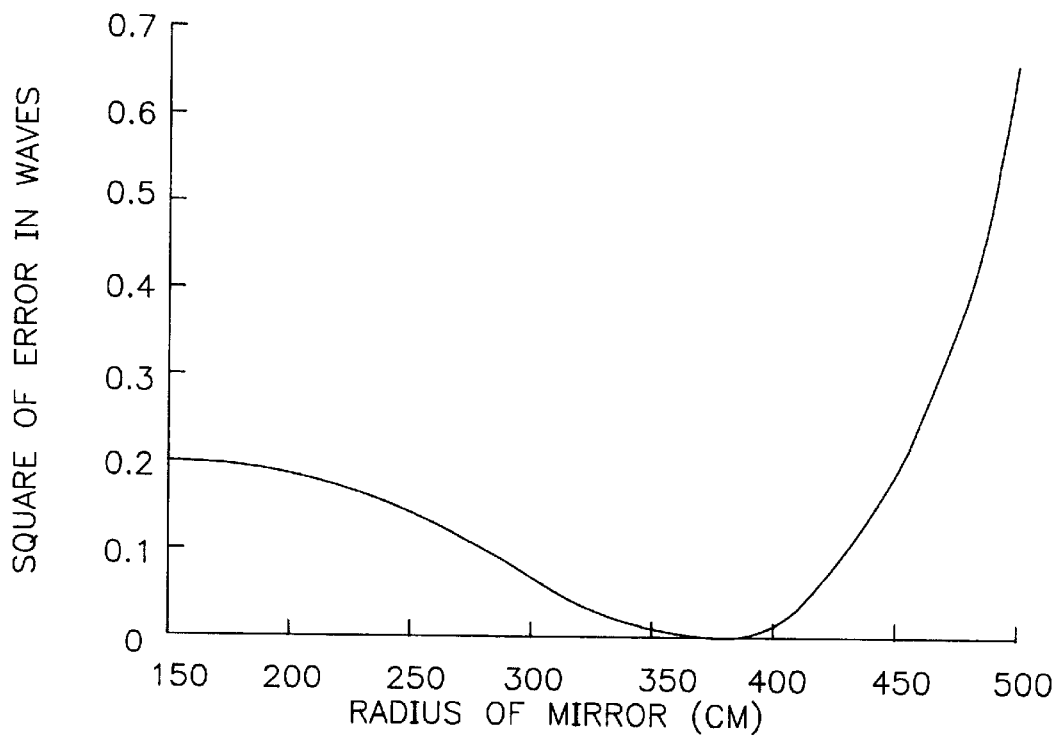
FIG. 5 is a graph showing the variation of phase error with primary mirror radius when a single-wavelength beacon beam is used.

Since the beacon source is effectively at the center of curvature of the primary mirror, $\cos\theta_B = 1$. For any particular value of $\theta_T$, or radius from the central axis of the mirror, there is a value of the wavelength ratio that makes the phase error zero. This is shown graphically in FIG. 5. The phase error becomes zero for a mirror radius approximately in the range 360–380 cm. The phase error increases slightly for smaller mirror radius values, and increases more rapidly for larger radius values.

A much more significant improvement in phase error can be obtained if different beacon wavelengths are used at different mirror radius values. This is shown in FIG. 4 for three different wavelengths. In accordance with this feature of the invention, the primary mirror may be thought of as comprising a number of concentric annular segments, three of which are shown in FIG. 4. The beacon source 94' illuminates three adjacent annular regions of the primary mirror 90 with light at wavelengths $\lambda_1$, $\lambda_2$ and $\lambda_3$.

This segmented beacon beam is reflected from the primary mirror 90 back toward the beacon source 94', and is reflected by the semireflective mirror 110, collimated by a lens 114, and reflected by appropriate plane mirrors 116, 118, 120, passing next through another lens 122, and another semireflective mirror 124, to be directed finally onto the hologram 104. Reference beams at these same wavelengths, $\lambda_1$, $\lambda_2$ and $\lambda_3$, are directed to annular regions of the hologram 104, to interfere with the segmented beacon beams and encode the hologram with the aberrations detected by the beacon beam.

In a subsequent phase of operation, the hologram is read by the target or image beam, which is reflected from the primary mirror to the secondary mirror 92, and from there is reflected to the semireflective mirror 124, which in turn reflects the target beam onto the hologram 104. Reading of the hologram 104 results in the production of an aberration-free image beam, which is focused by another lens 126 onto an image plane 128.

To properly create the hologram by interfering the aberrated beacon beam with the reference beam, the angle between the reference beam and the beacon beam at each wavelength is chosen such that the hologram fringe spacings in each annulus of the hologram are equal. Moreover, to obtain phase coherence over the entire aperture of the optical system, it is necessary to align the fringes across all of the annuli. If the primary mirror 90 has phase errors, the fringes are not straight and it is then the average positions of the fringes that must match. This phase adjustment is best made by imaging the hologram plane onto a Ronchi ruling (not shown) having the same spatial frequency as the hologram. Basically, the Ronchi ruling is a transparency having ruled opaque stripes across it with the same spacing as the hologram fringes. Light from each annulus of the beacon beam-passing through the ruling falls on a separate annular detector placed behind the Ronchi ruling. The phase in each annulus of the beacon beam may then be adjusted to maximize the light falling on the corresponding detector, thus making the average position of the fringes the same in all annuli.

The hologram may be implemented in any desired form. As presently preferred, the hologram is a liquid crystal device, which can be written into and read from rapidly enough for the invention to operate in real time for most applications. If the aberrations change slowly enough, the hologram may be take the form of a thermoplastic material.

Figure 6:
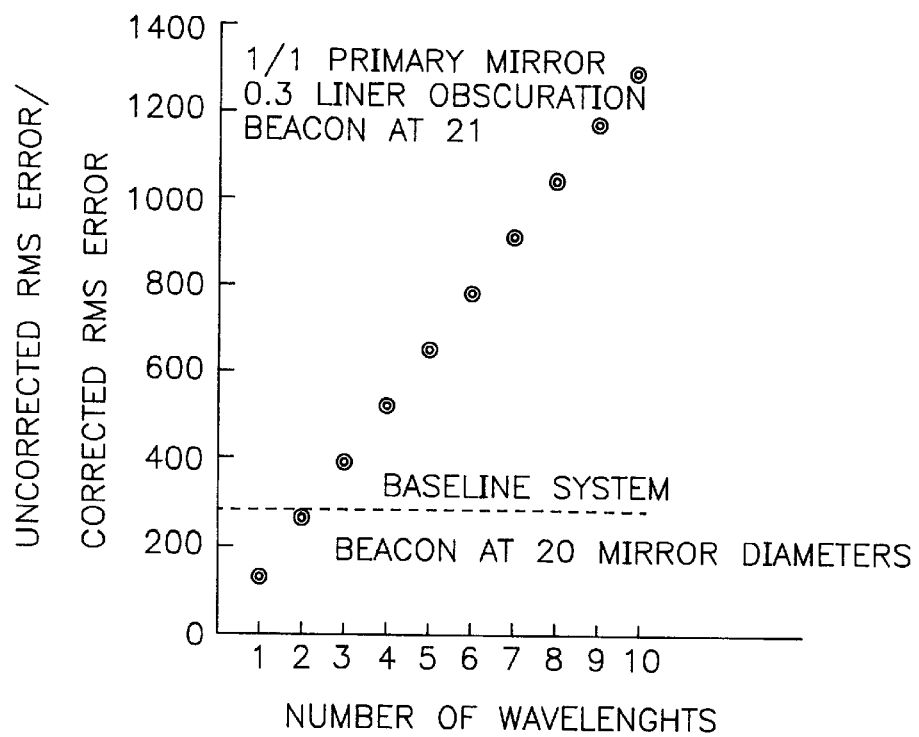
FIG. 6 is graph showing the relative improvement in performance for various numbers of beacon beam wavelengths.

The amount of correction in aberrations obtained by the use of multiple wavelengths for the beacon and reference beams increases practically linearly with the number of wavelengths used. This is shown graphically in FIG. 6. Clearly, the use of 8–10 different wavelengths produces the best performance, but at a cost of the optical complexity required to produce a large number of annular beams with the appropriate spacing, alignment, and phase.

It will be appreciated from the foregoing that the present invention represents a significant advance in the field of imaging telescopes of large size. In particular, the invention provides for automatic correction of phase aberrations introduced by a large optical element, without adaptive optics and without the need for two passes through the aberrating element. Use of the invention therefore results in a dramatic decrease in the cost, complexity and weight of large imaging telescopes. It will also be appreciated that, although a number of embodiments of the invention have been described in detail for purposes of illustration, various modifications may be made without departing from the spirit and scope of the invention. Accordingly, the invention is not to be limited, except as by the following claims.

We claim:

1. A large imaging telescope, comprising:
    a large primary optical mirror of imprecise construction, for receiving an image beam and producing an aberrated image beam;
    a secondary optical element for receiving light from the primary optical mirror and producing a reduced-diameter beam;
    means for generating a beacon beam that substantially fills the primary optical mirror, to produce an aberrated beacon beam; and
    holographic means having an aberration-free reference beam source;
    means for directing the aberrated beacon beam and the aberration-free reference beam onto the holographic means during an encoding phase of operation; and
    means for directing the aberrated image beam onto the holographic means during a holographic reading phase of operation, wherein the holographic means produces an aberration-free image beam for output;
    wherein the means for generating the beacon beam is positioned relatively close to the primary optical element;
    and wherein the means for generating the beacon beam includes null corrector optics to minimize spherical aberration that would otherwise be caused by positioning the means for generating the beacon beam close to the primary optical element;
    and wherein the means for generating the beacon beam provides a beacon beam of at least one selected wavelength different from the wavelength of the image beam;
    and wherein phase errors caused by differences in the angles of incidence of the beacon beam and the image beam on the primary optical element are minimized over at least one region of the primary optical element.

2. A large imaging telescope as defined in claim 1, wherein:
    the holographic means includes a real-time hologram;
    the means for generating the beacon beam provides multiple beacon beams of different selected wavelengths, directed at contiguous regions of the primary optical element; and
    the aberration-free reference beam source also includes means for generating multiple reference beams of the same selected wavelengths as the beacon beams, for interference with corresponding beacon beams, in multiple contiguous regions of the hologram.

3. A large imaging telescope as defined in claim 2, wherein:
    the multiple beacon beams, multiple reference beams, and multiple regions of the hologram are annular in shape, to minimize phase errors due to differences in angles of incidence of the beacon and image beams, over multiple annular regions of the primary optical element.

4. A large imaging telescope as defined in claim 3, wherein the means for generating the beacon beam further includes:
    means for adjusting the angles of incidence of the beacon beams relative to those of the reference beams, to ensure uniform fringe spacing in all annular regions of the hologram; and
    means for adjusting the phase of the beacon beams to ensure alignment and phase coherence of the fringes in the hologram.

5. A method for correcting for phase aberrations introduced in a primary optical element of an imaging telescope, the method comprising the steps of:
    locally generating a beacon beam that impinges on the large primary optical element;
    modifying the beacon beam in accordance with any phase-affecting aberrations of the primary optical element, to produce an aberrated beacon beam;
    producing from the primary optical element an aberrated image beam;
    introducing the aberrated image beam and the similarly aberrated beacon beam into a holographic device having a hologram; and
    producing in the holographic device an output beam proportional to the image beam, but having the aberrations removed as a result of interaction between the aberrated image beam and the similarly aberrated beacon beam;
    wherein the step of introducing the aberrated image beam and the aberrated beacon beam into the holographic device includes
        generating an aberration-free reference beam,
        encoding the aberrations of the primary optical element onto the hologram by interfering the aberrated beacon beam with the aberration-free reference beam, and then
        reading the hologram by directing the aberrated image beam into it and producing the desired aberration-free image beam;

and wherein the step of generating a beacon beam includes generating multiple beams at selected wavelengths different from that of the image beam;

and wherein the step of generating an aberration-free reference beam includes generating multiple beams at the same selected wavelengths as the beacon beam;

and wherein phase errors caused by differences in the angles of incidence of the beacon beam and the image beam on the primary optical element are minimized over multiple regions of the primary optical element, the locations of which are determined by the selection of the beacon beam frequencies;

and wherein the step of encoding the hologram is performed over multiple contiguous regions of the hologram, as determined by the multiple beacon beams and multiple reference beams.

6. A method as defined in claim 5, wherein:

the multiple regions of the primary optical element and the multiple regions of the hologram are annular in shape.

7. A method as defined in claim 6, and further including the steps of:

adjusting the angles of incidence of the beacon beams and the reference beams on the hologram to ensure approximate uniformity of spacing of interference fringes formed on the hologram; and adjusting the relative phases of the beacon beams provide phase coherence of the fringes over the entire hologram.

* * * * *